United States Patent
Rose et al.

(10) Patent No.: US 9,701,830 B1
(45) Date of Patent: Jul. 11, 2017

(54) EMULSIFIED POLYOL ACRYLATE POLYMERIC EMULSION BREAKERS

(71) Applicant: Jacam Chemical Company 2013, LLC, Sterling, KS (US)

(72) Inventors: David Jay Rose, Lyons, KS (US); Thomas Joseph Fortune, Sterling, KS (US); Thomas W. Burgoyne, Sterling, KS (US); Kim Brashear, Sterling, KS (US); Beth Ann Wolf, Hutchinson, KS (US); Gene H. Zaid, Sterling, KS (US)

(73) Assignee: Jacam Chemical Company 2013, LLC, Sterling, KS (US)

( * ) Notice: Subject to any disclaimer, the term of this patent is extended or adjusted under 35 U.S.C. 154(b) by 0 days.

(21) Appl. No.: 14/972,474

(22) Filed: Dec. 17, 2015

(51) Int. Cl.
*C08L 33/14* (2006.01)

(52) U.S. Cl.
CPC ........... *C08L 33/14* (2013.01); *C08L 2201/52* (2013.01)

(58) Field of Classification Search
CPC ...................................................... C08L 33/14
See application file for complete search history.

(56) References Cited

U.S. PATENT DOCUMENTS

| | | |
|---|---|---|
| 2,407,895 A | 9/1946 | Monson et al. |
| RE28,576 E | 10/1975 | Anderson et al. |
| 4,238,330 A | 12/1980 | Fong et al. |
| 4,505,839 A | 3/1985 | Bellos et al. |
| 4,731,481 A | 3/1988 | Bellos et al. |
| 5,393,463 A | 2/1995 | Fikentscher et al. |
| 5,607,574 A | 3/1997 | Hart |
| 5,609,794 A * | 3/1997 | Taylor .................. B01D 17/047 516/184 |
| 2010/0234631 A1 | 9/2010 | Misske et al. |
| 2011/0257328 A1* | 10/2011 | Debord ................ B01D 17/047 524/555 |

OTHER PUBLICATIONS

Al-Sabagh et al. Synthesis of Some Surfactants Based on Polytriethanolamine and Investigation of Their Surface Active Properties, Journal of Dispersion Science and Technology, 31:10, (2010) 1335-1343; available online at To link to this article: http://dx.doi.org/10.1080/01932690903227584.

Hafiz et al. "Synthesis and Evaluation of Polytriethanolamine Monooleates for Oil-Based Muds." Journal of Surfactants and Detergents, 6:3 (2003) 243-251.

Becker, J. R. "Crude Oil Waxes, Emulsions, and Asphaltenes." Tulsa: Penwell Publishing Company, 1997, pp. 84-86. Available online at https://books.google.com/books?id=Qw9gwzzf4SAC&pg=PA84&lpg=PA84&dq=poly+triethanolamine&source=bl&ots=Hocu0_PWqi&sig=iBRxxL-OWNcydBy6xD-Gh_OnIMM&hl=en&sa=X&ved=0CEAQ6AEwBWoVChMI2pPZy6TWxwIVy5yACh30WQff#v=onepage&q=poly%20triethanolamine&f=false.

* cited by examiner

*Primary Examiner* — Karuna P Reddy
(74) *Attorney, Agent, or Firm* — Hovey Williams LLP

(57) ABSTRACT

Improved emulsion breakers in the form of polyol acrylate polymers in water/oil emulsions have relatively high polymer contents and low inversion viscosities. The emulsion breakers can be prepared by mixing together acrylate monomer, polyol, water, liquid petroleum product, and emulsifier, followed by homogenization of the mixture; the latter is then subjected to free radical polymerization to polymerize the polyol and monomer in situ within the mixture.

8 Claims, No Drawings

US 9,701,830 B1

EMULSIFIED POLYOL ACRYLATE POLYMERIC EMULSION BREAKERS

BACKGROUND OF THE INVENTION

Field of the Invention

The present invention is broadly concerned with improved petroleum-water emulsion breakers useful in petroleum recovery industry. More particularly, the improved emulsion breakers are in the form of emulsified polyol acrylate polymers having high polymer loadings and low inversion viscosities. The invention also pertains to methods of preparing such emulsion breakers, and uses thereof.

Description of the Prior Art

An important objective of any oil production facility is the separation of water and other foreign materials from the produced crude. The breaking of these crude oil and water emulsions constitutes a challenging aspect in the oil production industry.

During the productive life of an oil or gas well, a stage is reached when water will be co-produced in unacceptable quantities. This water co-exists with the hydrocarbons in the reservoir and generally infiltrates into the hydrocarbon-bearing regions of the formation. Eventually water becomes a part of the production from the wells regardless of the method of recovery. Secondary or tertiary methods are another cause of water encroachment. These methods are employed to increase the amount of petroleum recovered from the reservoirs, and they may involve many different techniques. Some of these require the injection of water or steam into the reservoirs, which further complicates the emulsion problem.

An emulsion is a mixture of two immiscible liquids, one of which is dispersed as droplets in the other. The liquid of emulsion that is broken into droplets is known as the dispersed or internal phase, whereas the liquid surrounding the droplets is called the continuous or external phase. In the petroleum industry, water-in-oil emulsions (often referred to as "regular" emulsions) are the most frequently encountered. However, oil-in-water emulsions (sometimes known as "reverse" emulsions) are also very common.

A number of techniques have been employed for demulsification or breaking of emulsions, including heating, electrical processes of dehydration, mechanical separation equipment, free-water knockouts, and chemical injection. In many instances, chemical injections are preferred inasmuch as the emulsions are resolved more quickly and effectively than by other techniques; moreover, chemical treatments have a wide range of application and are equally adaptable to large- or small-scale operations.

Polymeric DMAEMA (dimethylaminoethylmethacrylate)-sulfuric acid salts have been used as oil-in-water emulsion breakers, i.e., water clarifiers or reverse breakers. See U.S. Pat. No. 4,238,330. However, at concentrations above about 10% of these products in water, the dispersions become too thick to pour and are thus difficult to use, particularly in field applications. Higher polymer concentration products are described in U.S. Pat. No. Re. 28,576. In this reference, a water-in-oil emulsion containing particles of vinyl addition polymer or gum is first created and is then inverted to release the polymer into water as a solution. However, the products of this reference do not provide increased polymer concentration with desirable viscosity properties.

There is accordingly a need in the art for improved emulsion breakers, which contain very high polymer loadings with viscosity values allowing them to be easily used under field conditions.

SUMMARY OF THE INVENTION

The present invention overcomes the problems outlined above and provides improved emulsion breakers, which can be contacted with petroleum-water emulsions (either oil-in-water or water-in-oil) to rapidly break the emulsions allowing ready separation of the oil and water fractions. Generally speaking, the emulsion breakers of the invention comprise a polyol acrylate polymer in an emulsion including water, a liquid petroleum product, and an emulsifier, wherein the emulsion breaker has a polymer content of more than about 24% by weight and an inversion viscosity of up to about 200 cps.

The emulsified products of the invention are produced by subjecting a mixture or blend comprising acrylate monomer, polyol, water, liquid petroleum product, and emulsifier to free radical polymerization, whereby droplets or particles of the synthesized polymer are surrounded by the petroleum product. This ensures that the final product has the desired emulsion-breaking properties.

In practice, the emulsion breakers of the invention can be used by contacting the breakers with petroleum-water emulsions, using any known technique for this purpose. This serves to effectively break the emulsions without need for further processing.

DETAILED DESCRIPTION OF THE PREFERRED EMBODIMENT

The present invention provides improved polymeric emulsion breakers which find particular utility in the petroleum industry for the breaking of water-in-oil or oil-in-water emulsions. The products of the invention exhibit greatly improved emulsion-breaking properties stemming from relatively high polymer concentrations coupled with relatively low viscosities.

The polymeric emulsions of the invention comprise respective amounts of polyol acrylate polymer(s), water, liquid petroleum product(s), and appropriate emulsifier(s). Desirably, droplets or particles of the polyol acrylate polymer are enrobed within liquid petroleum product(s) as a part of the emulsions. In terms of ranges, the final products should contain more than 24% by weight polyol acrylate polymer(s), more preferably from about 25-32% by weight, and most preferably from about 27-30% by weight; from about 28-38% by weight liquid petroleum product(s), more preferably from about 34-36% by weight; water should be present in the products at a level of from about 10-20% by weight, more preferably from about 12-15% by weight. The emulsifier content of the products is very small on a weight basis, and the importance of the emulsifiers is more predicated upon the combined HLB (hydrophilic-lipophilic balance) value of the emulsifier packages. Where the desired products of the invention are in the form of water-in-oil emulsions, the HLB value, depending upon the type of liquid petroleum product being used, should range from about 4-8. In the case of oil-in-water emulsions, the HLB value should range from about 10-15.

The finished polymeric emulsions of the invention should have a maximum inversion viscosity of up to about 200 cps, and more preferably up to about 185 cps, and most preferably from about 25-150 cps, using the test method described below.

Preparation of the products of the invention involves the emulsion synthesis of polyol acrylate polymer(s) in the presence of liquid petroleum products, water, and emulsifiers. To this end, the preferred starting reaction mixtures include appropriate monomer(s), polyol(s), liquid petroleum product(s), strong acid such as sulfuric acid, emulsifier(s), and ammonium chloride. Normally, the reaction mixtures are homogenized prior to initiating the polymerization reaction.

The starting reaction mixtures for the emulsion synthesis of the polyol acrylate polymers preferably contain more than about 24% by weight monomer(s), more preferably from about 25-32% by weight monomer(s), and most preferably from about 27-30% by weight monomer(s). The polyol content should range from about 3-6.5% by weight polyol(s), and more preferably from about 4.5-5% by weight polyol(s). Water should be present at a level of from about 10-20% by weight, and more preferably from about 12-15% by weight, while the petroleum product(s) should be present at a level of from about 28-38% by weight, and more preferably from about 34-36% by weight. These reaction mixtures also preferably include ammonium chloride at a level of from about 1.5-4% by weight, and more preferably from about 2-3% by weight, with sulfuric acid at a level of from about 7-11% by weight, and more preferably from about 8-10% by weight.

After preparation of the starting reaction mixtures, they are homogenized using vigorous agitation and are purged with nitrogen. Thereupon, the polymerization reaction is commenced by addition of a free radical initiator. The polymerization reaction is allowed to continue for a period of time, usually from about 1-6 hours, to create the final emulsified products.

All of the foregoing percentages are based upon the total weight of the final products or reaction mixtures as the case may be, taken as 100% by weight.

The following discussion explains the preferred components used in the preparation of the products of the invention, as well as typical reaction schemes.

The Preferred Monomers

The monomers useful in the preparation of the products of the invention are generally alkylaminoalkyl acrylates of the general formula

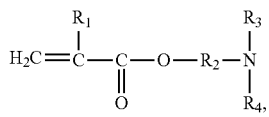

where $R_1$, $R_3$, and $R_4$ are each independently selected from the group consisting of H and C1-C4 alkyl groups, and $R_2$ is selected from the group consisting of C1-C6 alkyl groups. The alkyl groups in each instance may be straight or branched chain.

The paradigm acrylate monomer for use in the invention is N,N-dimethylaminoethylmethacrylate (DMAEMA), i.e., where $R_1$ is methyl, $R_2$ is ethyl, and $R_3$ and $R_4$ are both methyl. It is known that this monomer may be polymerized to generate linear poly(DMAEMA) using the following idealized reaction scheme, where DMAEMA is polymerized in the presence of strong acid, such as $H_2SO_4$, using a free radical initiator such as AIBN (azobisisobutyronitrile).

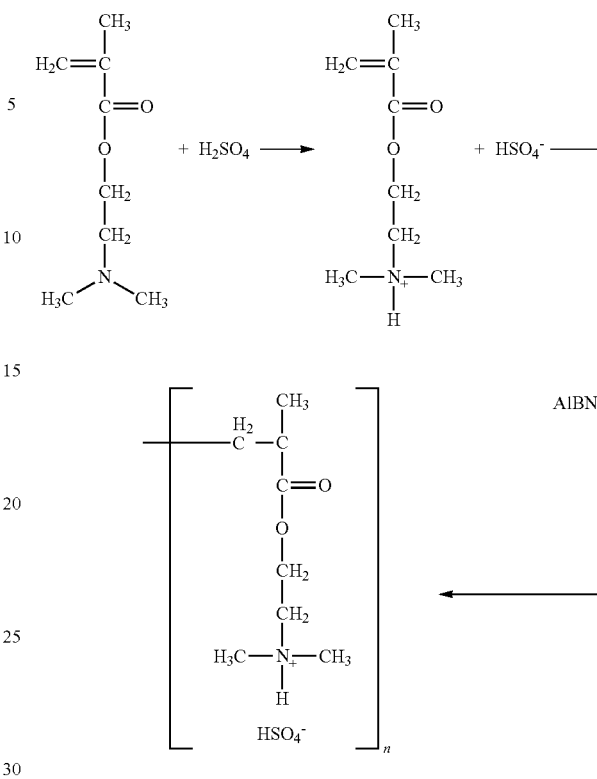

This linear poly(DMAEMA), as prepared in water, is useful as an oil-in-water emulsion breaker, but it is not nearly as active as the glycol acrylate polymeric emulsion products of the invention.

The Polyols

One or more polyol compounds may be used in the invention, such as C2-C6 alkylene glycols (e.g., ethylene or propylene glycols), aliphatic species, such as glycerin, mannitol, xylitol, and sorbitol. The most preferred polyols are the C2-C4 alkylene glycols.

The Liquid Petroleum Products

The petroleum products useful in the invention include kerosene, aircraft fuels, and other low-volatility hydrocarbons. Kerosene is the most preferred product, although any hydrocarbon which is a pourable liquid at room temperature and including a plurality of different hydrocarbons each having from about 10-16 carbon atoms may be used.

The Emulsifiers

A wide range of emulsifiers may be used in the invention, but it has been found that a combination of high and low HLB materials gives better results than a single material, and multiple high HLB materials combined with multiple low HLB materials give the best results. Thus, oleates, stearates, laurates, myristates, and palmitates have been successfully employed, along with lecithins (e.g., lecithin SGU) and phospholipids. Ethoxylated phenols can also be used to good effect, when used in minor amounts and in combination with other emulsifiers.

Preparation of the Emulsified Polyol Acrylate Polymers

As noted above, in preferred practice, the components of the final emulsion are mixed together and in situ polymerization reactions between the polyol and acrylate components are initiated. In the course of synthesis of the polymers, a number of different monomeric repeat units are created and polymerized via a free radical initiator in the presence of ammonium chloride. Such repeat units may include acid adducts of the starting monomer, which in the case of DMAEMA would be DMAEMA/HSO4$^-$ adducts where sulfuric acid is used as the strong acid. Additional repeat units would typically include the starting monomer itself, as well as reaction products between the starting monomers and the polyols. Whatever the nature of the repeat units, these are randomly polymerized to create crosslinked polymer chains by free radical polymerization.

The following idealized reaction scheme illustrates this procedure, where $R_5$ is a C2-C6 alkylene group (i.e., the polyol is a glycol), and n>>m>>o>>p.

As illustrated, the repeat units "A" are the acid adduct repeat units, whereas repeat units "B" are the unmodified monomer, and repeat units "C" and "D" are polyol/monomer reaction products. Generally, the acid adduct repeat units "A" are the predominant repeat units in the polymers, and are present in the polymers at a level of from about 30-45% by weight, more preferably from about 33-41% by weight.

EXAMPLES

The following examples set forth presently preferred products in accordance with the invention, and methods of preparation thereof. It is to be understood, however, that these examples are provided by way of illustration only, and

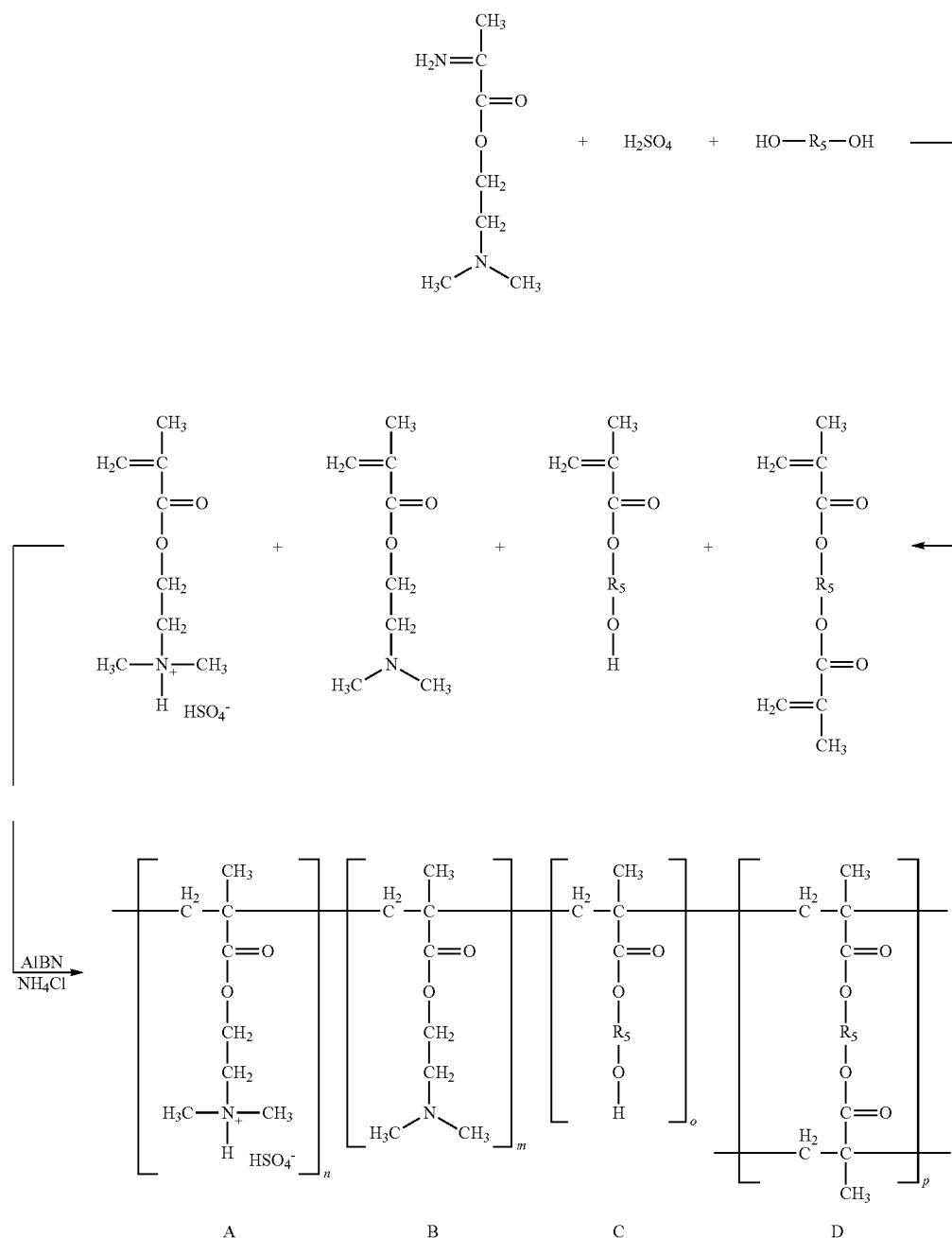

nothing therein should be taken as a limitation upon the overall scope of the invention.

Example 1

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 49.82 |
| NP-9.5 | 0.25 |
| NP-100 | 0.10 |
| Triton X-705 | 0.36 |
| Ethylene glycol | 10.00 |
| ammonium chloride | 6.00 |
| dimethylaminoethylmethacrylate | 69.56 |
| 96.5% sulfuric acid | 22.57 |
| Cool 10 minutes water bath | |
| Kerosene | 77.22 |
| Methyl Oleate | 2.48 |
| Tween 85 | 2.38 |
| SMO | 17.06 |
| formic acid | 0.01 |

[1] NP-9.5 is a mixture of poly(oxy1,2-ethylenediyl) alpha-(nonylphenyl)-omega-hydroxy glycol ethers, CAS #25625-71-8
[2] NP-100 is a mixture of nonylphenol ethoxylates having an average of 10 moles of ethoxylate per mole of nonylphenol, CAS #9016-45-9
[3] Triton X-705 is an octylphenol ethoxylate having an average of 55 moles of ethoxylate per mole of octylphenol
[4] Tween 85 is polyethylene glycol sorbitan trioleate, CAS #9005-70-3.
[5] SMO is sorbitan monooleate.

The mixture was homogenized using a Silverson L5M-A laboratory mixer for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 2

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 49.82 |
| NP-9.5 | 0.25 |
| NP-100 | 0.10 |
| Triton X-705 | 0.36 |
| Ethylene glycol | 10.00 |
| ammonium chloride | 6.00 |
| dimethylaminoethylmethacrylate | 69.56 |
| 96.5% sulfuric acid | 22.57 |
| Cool 10 minutes water bath | |
| Kerosene | 80.39 |
| Methyl Oleate | 2.48 |
| Tween 85 | 2.38 |
| SMS | 17.41 |
| SMO | 0.00 |
| formic acid | 0.01 |

[1] SMS is sorbitan monosterate.

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. The product was then scooped from the flask to be dried out.

Example 3

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 49.82 |
| NP-9.5 | 0.25 |
| NP-100 | 0.10 |
| Triton X-705 | 0.36 |
| Ethylene glycol | 10.00 |
| ammonium chloride | 6.00 |
| dimethylaminoethylmethacrylate | 69.56 |
| 96.5% sulfuric acid | 22.57 |
| Cool 10 minutes water bath | |
| Kerosene | 77.23 |
| Methyl Oleate | 0.00 |
| Tween 85 | 4.86 |
| SMS | 8.70 |
| SMO | 8.70 |
| formic acid | 0.01 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 4

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 49.82 |
| NP-9.5 | 0.25 |
| NP-100 | 0.10 |

-continued

| | |
|---|---|
| Triton X-705 | 0.36 |
| Ethylene glycol | 10.00 |
| ammonium chloride | 6.00 |
| dimethylaminoethylmethacrylate | 72.15 |
| 96.5% sulfuric acid | 23.41 |
| Cool 10 minutes water bath | |
| Kerosene | 77.22 |
| Methyl Oleate | 2.75 |
| Tween 85 | 2.64 |
| STO | 8.53 |
| Lecithin SGU | 8.53 |
| formic acid | 0.01 |

[1]STO is sorbitan trioleate.
[2]Lecithin SGU is unbleached soy lecithin.

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 5

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 49.82 |
| NP-9.5 | 0.25 |
| NP-100 | 0.10 |
| Triton X-705 | 0.36 |
| glycerin | 6.67 |
| ammonium chloride | 6.00 |
| dimethyl aminoethylmethacrylate | 72.15 |
| 96.5% sulfuric acid | 23.41 |
| Cool 10 minutes water bath | |
| Kerosene | 77.22 |
| Methyl Oleate | 2.75 |
| Tween 85 | 2.64 |
| STO | 8.53 |
| Lecithin SGU | 8.53 |
| formic acid | 0.01 |

The mixture was homogenized using a Silverson LSM-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 6

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 39.82 |
| NP-9.5 | 0.25 |
| NP-100 | 0.10 |
| Triton X-705 | 0.36 |
| Propylene glycol | 0.00 |
| Ethylene glycol | 12.50 |
| glycerin | 0.00 |
| ammonium chloride | 7.00 |
| dimethylaminoethylmethacrylate | 81.17 |
| 96.5% sulfuric acid | 26.34 |
| Cool 10 minutes water bath | |
| Kerosene | 109.03 |
| Methyl Oleate | 2.75 |
| Tween 85 | 2.64 |
| STO | 8.53 |
| Lecithin SGU | 8.53 |
| formic acid | 0.01 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 7

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 39.82 |
| NP-9.5 | 0.13 |
| NP-100 | 0.15 |
| Triton X-705 | 0.18 |
| Propylene glycol | 0.00 |
| Ethylene glycol | 12.50 |
| glycerin | 0.00 |
| ammonium chloride | 8.00 |
| dimethylaminoethylmethacrylate | 90.07 |
| 96.5% sulfuric acid | 29.23 |
| Cool 15 minutes water bath | |
| Kerosene | 109.03 |
| Methyl Oleate | 1.45 |
| Tween 85 | 1.32 |
| STO | 4.27 |
| Lecithin SGU | 4.27 |
| SMO | 4.27 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 8

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 39.82 |
| NP-9.5 | 0.13 |
| NP-100 | 0.05 |
| Triton X-705 | 0.18 |
| Propylene glycol | 0.00 |
| Ethylene glycol | 12.50 |
| glycerin | 0.00 |
| ammonium chloride | 8.00 |
| dimethylaminoethylmethacrylate | 90.07 |
| 96.5% sulfuric acid | 29.23 |
| Cool 15 minutes water bath | |
| Kerosene | 109.03 |
| Methyl Oleate | 5.33 |
| Tween 85 | 1.32 |
| STO | 4.27 |
| Lecithin SGU | 4.27 |
| SMO | 4.27 |

The mixture was homogenized using a Silverson LSM-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 9

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 39.82 |
| NP-9.5 | 0.13 |
| NP-100 | 0.05 |
| Triton X-705 | 0.18 |
| Propylene glycol | 0.00 |
| Ethylene glycol | 12.50 |
| glycerin | 0.00 |
| ammonium chloride | 8.00 |
| dimethylaminoethylmethacrylate | 90.07 |
| 96.5% sulfuric acid | 29.23 |
| Cool 15 minutes water bath | |
| Kerosene | 109.03 |
| Methyl Oleate | 0.69 |
| Tween 85 | 3.17 |
| STO | 5.34 |
| Lecithin SGU | 5.34 |
| SMO | 5.34 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 10

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 39.82 |
| NP-9.5 | 0.13 |
| NP-100 | 0.05 |
| Triton X-705 | 0.18 |
| Propylene glycol | 0.00 |
| Ethylene glycol | 12.50 |
| glycerin | 0.25 |
| ammonium chloride | 8.00 |
| dimethylaminoethylmethacrylate | 90.07 |
| 96.5% sulfuric acid | 29.23 |
| Cool 15 minutes water bath | |
| Kerosene | 109.03 |
| Methyl Oleate | 1.45 |
| Tween 85 | 1.32 |
| STO | 4.27 |
| Lecithin SGU | 4.27 |
| SMO | 4.27 |

The mixture was homogenized using a Silverson LSM-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 11

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| | |
|---|---|
| water | 39.82 |
| NP-9.5 | 0.13 |
| NP-100 | 0.05 |
| Triton X-705 | 0.18 |
| Propylene glycol | 0.25 |
| Ethylene glycol | 12.50 |
| glycerin | 0.25 |
| ammonium chloride | 8.00 |
| dimethylaminoethylmethacrylate | 90.07 |
| 96.5% sulfuric acid | 29.23 |

-continued

| Cool 15 minutes water bath | |
|---|---|
| Kerosene | 109.03 |
| Methyl Oleate | 1.45 |
| Tween 85 | 1.32 |
| STO | 4.27 |
| Lecithin SGU | 4.27 |
| SMO | 4.27 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 12

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| water | 39.82 |
|---|---|
| NP-9.5 | 0.13 |
| NP-100 | 0.05 |
| Triton X-705 | 0.18 |
| Propylene glycol | 0.50 |
| Ethylene glycol | 12.50 |
| glycerin | 0.50 |
| ammonium chloride | 8.00 |
| dimethylaminoethylmethacrylate | 90.07 |
| 96.5% sulfuric acid | 29.23 |
| Cool 15 minutes water bath | |
| Kerosene | 109.03 |
| Methyl Oleate | 1.45 |
| Tween 85 | 1.32 |
| STO | 4.27 |
| Lecithin SGU | 4.27 |
| SMO | 4.27 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 13

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| water | 39.82 |
|---|---|
| NP-9.5 | 0.13 |
| NP-100 | 0.05 |
| Triton X-705 | 0.18 |
| Propylene glycol | 1.00 |
| Ethylene glycol | 12.50 |
| glycerin | 1.00 |
| ammonium chloride | 8.00 |
| dimethylaminoethylmethacrylate | 90.07 |
| 96.5% sulfuric acid | 29.23 |
| Cool 15 minutes water bath | |
| Kerosene | 109.03 |
| Methyl Oleate | 1.45 |
| Tween 85 | 1.32 |
| STO | 4.27 |
| SOU | 4.27 |
| SMO | 4.27 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 14

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| water | 39.82 |
|---|---|
| NP-9.5 | 0.13 |
| NP-100 | 0.05 |
| Triton X-705 | 0.18 |
| Propylene glycol | 0.25 |
| Ethylene glycol | 12.50 |
| glycerin | 0.25 |
| ammonium chloride | 8.00 |
| dimethylaminoethylmethacrylate | 94.44 |
| 96.5% sulfuric acid | 30.64 |
| Cool 15 minutes water bath | |
| Kerosene | 109.03 |
| Methyl Oleate | 1.45 |
| Tween 85 | 1.32 |
| STO | 4.27 |
| Lecithin SGU | 4.27 |
| SMO | 2.14 |

The mixture was homogenized using a Silverson LSM-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. After 2 hrs., another 0.1 g of AIBN was added. Reaction was stopped when precipitate appeared on the reactor side. The reaction was filtered through cheese cloth to remove highly cross-linked material.

Example 15

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| water | 39.82 |
| --- | --- |
| NP-9.5 | 0.20 |
| NP-100 | 0.05 |
| Triton X-705 | 0.18 |
| Ethylene glycol | 15.00 |
| ammonium chloride | 8.00 |
| dimethylaminoethylmethacrylate | 90.07 |
| 96.5% sulfuric acid | 29.23 |
| Cool 15 minutes water bath | |
| Kerosene | 109.03 |
| Methyl Oleate | 1.45 |
| Tween 85 | 1.32 |
| STO | 4.39 |
| Lecithin SGU | 4.27 |
| SMO | 2.14 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. Reaction was stopped when precipitate appeared on the reactor side, approximately 3 hrs. The reaction was filtered through cheese cloth to remove highly cross-linked material.

Example 16

The listed ingredients (amounts in grams) were placed, in order, into a 400 mL beaker. The ingredients above the cooling step were first placed into the beaker and allowed to react. Thereafter, the reaction mixture was cooled in a water bath and the remaining ingredients were placed in order into the beaker.

| water | 39.82 |
| --- | --- |
| NP-9.5 | 0.13 |
| NP-100 | 0.05 |
| Triton X-705 | 0.18 |
| Ethylene glycol | 18.75 |
| ammonium chloride | 8.00 |
| dimethylaminoethylmethacrylate | 90.07 |
| 96.5% sulfuric acid | 29.23 |

| -continued | |
| --- | --- |
| Cool 15 minutes water bath | |
| Kerosene | 109.03 |
| Methyl Oleate | 1.45 |
| Tween 85 | 1.32 |
| STO | 4.27 |
| Lecithin SGU | 4.27 |
| SMO | 4.27 |

The mixture was homogenized using a Silverson L5M-A for 0.5 hrs. The homogenized mixture was transferred to 500 mL three necked round bottom fitted with a mechanical stirrer, a nitrogen inlet, and a nitrogen outlet. The round bottom was purged for 0.5 hrs. with nitrogen while being cooled in a water bath. Then 0.1 g of AIBN was added. Reaction was stopped when precipitate appeared on the reactor side, approximately 3 hrs. The reaction was filtered through cheese cloth to remove highly cross-linked material.

Each of the emulsions prepared in Examples 1-16 were subjected to an inversion viscosity test wherein 1 g of the emulsion was placed in 100 g of water in a 4 oz. French square bottle, followed by vigorous shaking for one minute. Thereupon, the samples were tested at room temperature using a Brookfield DV-E viscometer employing an S-62 spindle at 100 rpm, until maximum cps viscosity was achieved. The following table sets forth the makeup of the 1-16 Examples together with the results of the inversion tests. As shown, the percent DMAEMA was above 24% by weight in each Example, and the maximum inversion viscosities ranged from 32.4-171.3 cps.

| Batch | Inversion (cps) | % by wt. DMAEMA | % by wt. Glycols | % by wt. Ammonium Chloride | % by wt. H2SO4 | % by wt. DMAEMA/ H2SO4 | % by wt. Kerosene | % by wt. Water |
| --- | --- | --- | --- | --- | --- | --- | --- | --- |
| 1 | 32.4 | 26.98 | 3.87 | 2.32 | 8.75 | 35.73 | 29.95 | 19.32 |
| 2 | 54 | 26.62 | 3.83 | 2.30 | 8.63 | 35.25 | 30.76 | 19.06 |
| 3 | 50 | 26.94 | 3.87 | 2.32 | 8.74 | 35.69 | 29.92 | 19.30 |
| 4 | 63.6 | 27.56 | 3.82 | 2.29 | 8.94 | 36.50 | 29.50 | 19.03 |
| 5 | 57.9 | 27.92 | 2.58 | 2.32 | 9.06 | 36.98 | 29.88 | 19.28 |
| 6 | 72.6 | 27.14 | 4.18 | 2.34 | 8.81 | 35.95 | 36.44 | 13.32 |
| 7 | 115 | 29.57 | 4.10 | 2.62 | 9,60 | 39.17 | 35.80 | 13.07 |
| 8 | 81 | 29.20 | 4.05 | 2.59 | 9.48 | 38.67 | 35.35 | 12.91 |
| 9 | 87.6 | 29.16 | 4.05 | 2.59 | 9.46 | 38.62 | 35.30 | 12.89 |
| 10 | 105 | 29.54 | 4.18 | 2.62 | 9.59 | 39.13 | 35.77 | 13.06 |
| 11 | 135 | 29.52 | 4.26 | 2.62 | 9.58 | 39.10 | 35.74 | 13.05 |
| 12 | 136 | 29.47 | 4.42 | 2.62 | 9.57 | 39.04 | 35.68 | 13.03 |
| 13 | 113.1 | 29.38 | 4.73 | 2.61 | 9.53 | 38.91 | 35.56 | 12.99 |
| 14 | 110 | 30.59 | 4.21 | 2.59 | 9.92 | 40.51 | 35.31 | 12.90 |
| 15 | 171.3 | 29.52 | 4.92 | 2.62 | 9.58 | 39.10 | 35.73 | 13.05 |
| 16 | 111.9 | 28.98 | 6.03 | 2.57 | 9.40 | 38.38 | 35.08 | 12.81 |

We claim:

1. An emulsion breaker comprising a polyol acrylate polymer in an emulsion including water, a liquid petroleum product, and an emulsifier, said emulsion breaker having a polymer content of more than about 24% by weight and an inversion viscosity of up to about 200 cps, said polymer including repeat units resulting from the reaction of an acrylate ester and a polyol, said acrylate ester of the structure

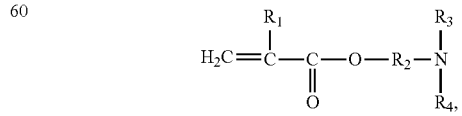

where $R_1$, $R_3$, and $R_4$ are each independently selected from the group consisting of H and C1-C4 alkyl groups, and $R_2$ is selected from the group consisting of C1-C6 alkyl groups, said alkyl groups in each instance being straight or branched chain, said polyol selected from the group consisting of C2-C6 alkylene glycols, mannitol, xylitol, sorbitol, glycerin, and mixtures thereof, said water being present at a level of from about 10-20% by weight, said liquid petroleum product being a hydrocarbon which is a pourable liquid at room temperature and including a plurality of different hydrocarbons each having from about 10-16 carbon atoms and comprising kerosene and being present at a level of from about 28-38% by weight, said percentages based upon the total weight of the emulsion breaker taken as 100% by weight.

2. The emulsion breaker of claim 1, said polymer being present at a level of from about 25-32% by weight.

3. The emulsion breaker of claim 1, said acrylate ester being DMAEMA.

4. The emulsion breaker of claim 1, said emulsifier comprising a plurality of different emulsifiers.

5. The emulsion breaker of claim 1, said inversion viscosity being from about 25-150 cps.

6. The emulsion breaker of claim 4, said different emulsifiers including emulsifiers having high and low HLB values.

7. The emulsion breaker of claim 1, said emulsifier comprising one or more oleates, stearates, laurates, myristates, palmatates, lecithins, and ethoxylated phenols emulsifiers.

8. An emulsion breaker comprising a polyol acrylate polymer in an emulsion including water, a liquid petroleum product, and an emulsifier, said emulsion breaker having a polymer content of more than about 24% by weight and an inversion viscosity of up to about 200 cps, said polymer including repeat units resulting from the reaction of an acrylate ester and a polyol, said acrylate ester of the structure

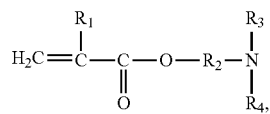

where $R_1$, $R_3$, and $R_4$ are each independently selected from the group consisting of H and C1-C4 alkyl groups, and $R_2$ is selected from the group consisting of C1-C6 alkyl groups, said alkyl groups in each instance being straight or branched chain, said polyol selected from the group consisting of C2-C6 alkylene glycols, mannitol, xylitol, sorbitol, glycerin, and mixtures thereof, said water being present at a level of from about 10-20% by weight, said liquid petroleum product being present at a level of from about 28-38% by weight, said emulsifier comprising a plurality of different emulsifiers having high and low HLB values, said percentages based upon the total weight of the emulsion breaker taken as 100% by weight.

\* \* \* \* \*